US012626587B2

(12) United States Patent
Kashiwakura et al.

(10) Patent No.: US 12,626,587 B2
(45) Date of Patent: May 12, 2026

(54) INFORMATION PROCESSING METHOD FOR TRANSMITTING INFORMATION ABOUT A FUNCTION OF A ROADSIDE DEVICE AND ROADSIDE DEVICE

(71) Applicant: TOYOTA JIDOSHA KABUSHIKI KAISHA, Toyota (JP)

(72) Inventors: Toshiki Kashiwakura, Tokyo (JP); Chihiro Inaba, Tokyo (JP); Shoi Suzuki, Tokyo (JP); Tsuyoshi Okada, Nagoya (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/897,510

(22) Filed: Sep. 26, 2024

(65) Prior Publication Data

US 2025/0218283 A1 Jul. 3, 2025

(30) Foreign Application Priority Data

Dec. 28, 2023 (JP) ................................ 2023-223087

(51) Int. Cl.
*G08G 1/005* (2006.01)
*G08G 1/01* (2006.01)

(52) U.S. Cl.
CPC .......... *G08G 1/005* (2013.01); *G08G 1/0116* (2013.01)

(58) Field of Classification Search
None
See application file for complete search history.

(56) References Cited

U.S. PATENT DOCUMENTS

2019/0221115 A1* 7/2019 Masuike .................. G08G 1/07

FOREIGN PATENT DOCUMENTS

JP 2023-050629 A 4/2023

* cited by examiner

*Primary Examiner* — John F Mortell
(74) *Attorney, Agent, or Firm* — SoraIP, Inc.

(57) ABSTRACT

The information processing method is an information processing method executed by a computer capable of communicating with one or more terminal devices and one or more roadside devices, and includes: acquiring position information of the terminal device; detecting that the terminal device has entered a predetermined geographical range in which the roadside device is installed based on the acquired position information; and transmitting instruction information instructing a function explanation of the roadside device to at least one of the terminal device and the roadside device when the terminal device detects that the terminal device has entered the geographical range.

7 Claims, 3 Drawing Sheets

INFORMATION PROCESSING METHOD FOR TRANSMITTING INFORMATION ABOUT A FUNCTION OF A ROADSIDE DEVICE AND ROADSIDE DEVICE

CROSS-REFERENCE TO RELATED APPLICATION

This application claims priority to Japanese Patent Application No. 2023-223087 filed on Dec. 28, 2023, incorporated herein by reference in its entirety.

BACKGROUND

1. Technical Field

The present disclosure relates to an information processing method and a roadside device.

2. Description of Related Art

Conventionally, a technique for monitoring a vehicle with a communication function is known in the art. For example, Japanese Unexamined Patent Application Publication No. 2023-50629 (JP 2023-50629 A) discloses a notification system that notifies pedestrians or vehicles other than an autonomous vehicle that is going to pass through a predetermined traffic area of whether the pedestrians or the vehicles can proceed, or alerts the pedestrians or the vehicles, according to the behavior of the autonomous vehicle.

SUMMARY

There is a demand for improvement in the technique for monitoring a vehicle with a communication function.

In view of such circumstances, an object of the present disclosure is to improve a technique for monitoring a vehicle with a communication function.

An information processing method according to one embodiment of the present disclosure is an information processing method to be executed by a computer configured to communicate with one or more terminal devices and one or more roadside devices. The information processing method includes:

acquiring position information of the terminal device;

detecting, based on the acquired position information, that the terminal device has entered a predetermined geographical range in which the roadside device is installed; and transmitting, when detection is made that the terminal device has entered the geographical range, instruction information for instruction on description about a function of the roadside device to at least either of the terminal device and the roadside device.

According to the embodiment of the present disclosure, the technique for monitoring a vehicle with a communication function can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
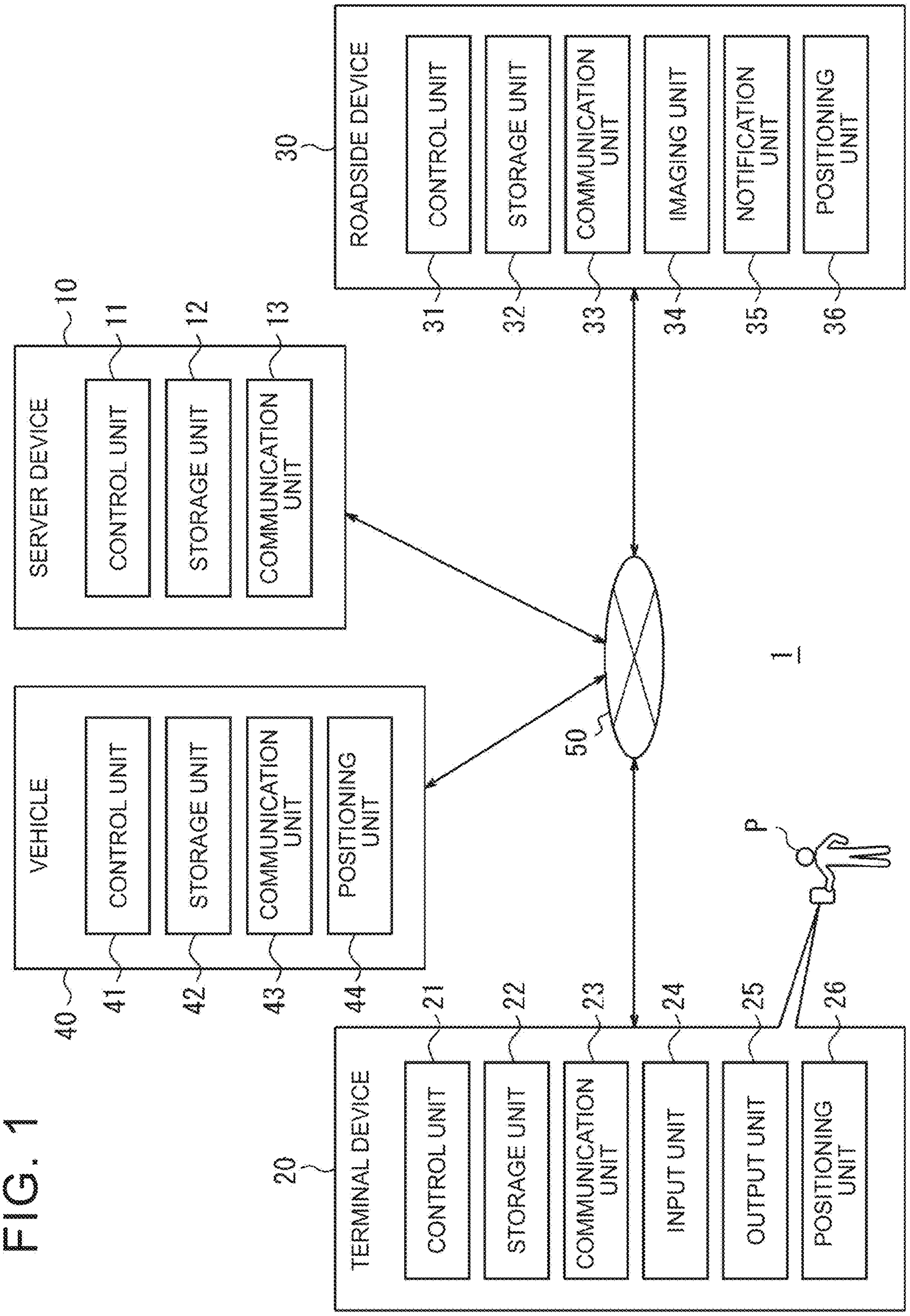
FIG. 1 is a diagram illustrating a configuration example of an information processing system according to an embodiment of the present disclosure.

Hereinafter, an embodiment of the present disclosure will be described below with reference to the drawings. In the drawings, parts having the same configuration or function are denoted by the same reference numerals. In the description of the present embodiment, duplicate descriptions of the same parts may be omitted or simplified as appropriate.

Outline of Embodiment

FIG. 1 is a diagram illustrating a configuration example of an information processing system 1 according to an embodiment of the present disclosure. The information processing system 1 includes a server device 10, a terminal device 20, a roadside device 30, and a vehicle 40. The server device 10, the terminal device 20, the roadside device 30, and the vehicle 40 are communicably connected to a network 50 including, for example, a mobile communication network and the Internet.

The vehicle 40 travels on a roadway to move a person, an object, and the like. The vehicles 40 are, for example, gasoline-powered vehicles, battery electric vehicle (BEV), hybrid electric vehicle (HEV), plug-in hybrid electric vehicle (PHEV), or fuel cell electric vehicle (FCEV). However, the vehicle 40 is not limited thereto. Vehicle 40 may be any automobile capable of being ridden by a human. The vehicle 40 may be, for example, an autonomous vehicle capable of autonomous driving corresponding to any of the levels 1 to 5 defined in SAE (Society of Automotive Engineers). In the present embodiment, the vehicle 40 can perform autonomous driving at the level 3 or 4, and the driving assistant can override the driving operation on the vehicle 40 or remotely. The information processing system 1 may include one or more arbitrary numbers of vehicles 40.

Roadside device 30, to the driver and the pedestrian P, etc. of the vehicle 40, an image of the approach of the pedestrian P and the vehicle 40 or the like located at the blind spot, light, and notifies by voice or the like, to create a sense of security in the environment where the automatic driving vehicle is running. The roadside device 30 may only notify information about the autonomous vehicle. The roadside device 30 is installed on the roadside side of the roadway, including, for example, the vicinity of an intersection or a crosswalk. In the present embodiment, the roadside device 30 can acquire the position information of the vehicle 40 and the terminal device 20 from the server device 10, and can detect the pedestrian P, the vehicle 40, or the like that is going to cross the roadway from the image of the camera (the imaging unit 34). For example, when the roadside device 30 detects the pedestrian P who intends to cross the roadway, it notifies the pedestrian P of the presence or absence of the vehicle 40 approaching the own vehicle. When the roadside device 30 detects the pedestrian P that is to cross the roadway, it notifies the driver or the driver assistant of the vehicle 40 that has entered the detection area of the own vehicle of the presence of the pedestrian P. The information processing system 1 may include any number of one or more roadside devices 30. The roadside device 30 may be operated by a battery.

The terminal device 20 is a device held by the pedestrian P, which has an information communication function connected to the network 50 by mobile communication, and is configured to be capable of executing various information processing and output of information. The terminal device 20 includes one or more GNSS (Global Navigation Satellite System) receivers or GPS (Global Positioning System) receivers (positioning unit 26) and can detect the present position. The terminal device 20 is, for example, a smartphone, a smartwatch, a wearable terminal, or the like. The information processing system 1 may include one or more arbitrary number of terminal devices 20.

The server device 10 as the information processing apparatus according to the present embodiment is one or a plurality of computers capable of communicating with each other. The server device 10 is used to monitor each vehicle 40 by communicating with each vehicle 40, each roadside device 30, and each terminal device 20. In the present embodiment, the server device 10 is used, for example, by an operator of a control center.

As described above, when the pedestrian P traveling toward the roadway of the autonomous vehicle is detected from the camera image, the roadside device 30 notifies the pedestrian P and also notifies the driving assistant of the autonomous vehicle approaching the roadside device 30. Such a roadside device 30 is not generally known, and a pedestrian P who uses the roadside device 30 for the first time may not know the function of the roadside device 30 and the meaning of the notification. From the viewpoint of ensuring the safety of the pedestrian P and improving the convenience, it is desirable to make the function of the roadside device 30 known to the pedestrian P entering the area where the roadside device 30 is installed.

Therefore, the information processing system 1 explains the functions of the roadside device 30 by the terminal device 20, the roadside device 30, and the like held by the pedestrian P in accordance with the fact that the pedestrian P has entered a certain region, the distance between the pedestrian P and the roadside device 30, the presence or absence of the neighboring vehicle 40, the running state thereof, and the like. Specifically, the server device 10 acquires the position information of the terminal device 20. Based on the acquired positional information, the server device 10 detects that the terminal device 20 has entered a predetermined geographical range in which the roadside device 30 is installed. When detecting that the terminal device 20 has entered the geographical range, the server device 10 transmits instruction information instructing the function explanation of the roadside device 30 to at least one of the terminal device 20 and the roadside device 30. The terminal device 20 and the roadside device 30, which have received the instruction information from the server device 10, explain the functions of the roadside device 30 to the pedestrian P through image display, audio output, and the like.

In this way, when the information processing system 1 detects that the terminal device 20 has entered a predetermined geographical range, the function description of the roadside device 30 is performed via the terminal device 20 and/or the roadside device 30. Therefore, the function of the roadside device 30 is known to the pedestrian P who has entered the vicinity of the roadside device 30, and it is possible to ensure the safety and improve the convenience of the pedestrian P.

Hereinafter, an example in which the number of the server device 10, the terminal device 20, the roadside device 30, and the vehicle 40 is one will be described, but the number thereof is arbitrary. In addition, although an example in which the pedestrian P is one and the pedestrian P holds the terminal device 20 will be described below, a pedestrian may be present in addition to the pedestrian P. There may be a pedestrian who does not hold the terminal device 20.

Configuration Example of the Server Device 10

As illustrated in FIG. 1, the server device 10 includes a control unit 11, a storage unit 12, and a communication unit 13.

The control unit 11 includes one or more processors, one or more programmable circuits, one or more dedicated circuits, or a combination thereof. The processor may be, but is not limited to, a general-purpose processor such as, for example, CPU (Central Processing Unit) or GPU (Graphics Processing Unit), or a special-purpose processor specialized for a particular process. The programmable circuits are, for example, a field-programmable gate array (FPGA), but are not limited to the circuit. The dedicated circuits are, for example, an application specific integrated circuit (ASIC), but are not limited to the circuit. The control unit 11 controls the overall operation of the server device 10.

The storage unit 12 includes one or more memories. In the present embodiment, the "memory" is, for example, a semiconductor memory, a magnetic memory, an optical memory, or the like, but is not limited thereto. Each memory included in the storage unit 12 may function as, for example, a main storage device, an auxiliary storage device, or a cache memory. The storage unit 12 stores arbitrary information used for the operation of the server device 10. For example, the storage unit 12 may store a system program, an application program, and embedded software. The information stored in the storage unit 12 may be updatable by, for example, information acquired from the network 50 via the communication unit 13.

The communication unit 13 includes one or more communication interfaces connected to the network 50. The communication interface corresponds to, for example, a wired LAN (Local Area Network) standard, a radio LAN standard, or a mobile communication standard, but is not limited thereto, and may correspond to any communication standard. Examples of the mobile communication standard include 4G (4th Generation) and 5G (5th Generation). In the present embodiment, the server device 10 communicates with the terminal device 20, the roadside device 30, and the vehicle 40 via the communication unit 13 and the network 50.

Configuration Example of the Terminal Device 20

As illustrated in FIG. 1, the terminal device 20 includes a control unit 21, a storage unit 22, a communication unit 23, an input unit 24, an output unit 25, and a positioning unit 26.

The control unit 21, the storage unit 22, and the communication unit 23 of the terminal device 20 can be configured in the same manner as the control unit 11, the storage unit 12, and the communication unit 13 of the server device 10, and detailed description thereof will be omitted.

The input unit 24 includes one or more input devices that detect user input. The input device is, for example, a physical key, a capacitive key, a pointing device such as a mouse, a touch screen integrally provided with a display of the output unit 25, a microphone that receives an audio input, or the like, but is not limited thereto. Alternatively, the input unit 24 may include an input interface that detects a user input via an external input device.

The output unit 25 includes one or more output devices that output information. For example, the output device is, but is not limited to, a display that outputs information as images, a speaker that outputs information as audio, and the like. Alternatively, the output unit 25 may include an output interface that outputs information via an external output device.

The positioning unit 26 includes a positioning device for measuring the position of the terminal device 20. The positioning device includes:

One or more GNSS receivers, GPS receivers, or the like, but are not limited thereto, and may be any sensor.

Configuration Example of the Roadside Device 30

As illustrated in FIG. 1, the roadside device 30 includes a control unit 31, a storage unit 32, a communication unit 33, an imaging unit 34, a notification unit 35, and a positioning unit 36.

The control unit 31, the storage unit 32, and the communication unit 33 of the roadside device 30 can be configured in the same manner as the control unit 11, the storage unit 12, and the communication unit 13 of the server device 10, and detailed description thereof will be omitted. The positioning unit 36 of the roadside device 30 can be configured similarly to the positioning unit 26 of the terminal device 20, and a detailed description thereof will be omitted.

The imaging unit 34 includes one or more cameras capable of photographing a surrounding landscape. In the present embodiment, the roadside device 30 is installed, for example, in the vicinity of the boundary between the sidewalk and the roadway so that the imaging unit 34 can photograph the pedestrian P moving from the sidewalk toward the roadway.

The notification unit 35 includes one or more notification devices that notify the nearby pedestrian P of information. The notification device is, for example, a speaker, an electronic bulletin board, a display, or the like, but is not limited thereto, and may be any notification device.

Configuration Example of the Vehicle 40

As illustrated in FIG. 1, the vehicle 40 includes a control unit 41, a storage unit 42, a communication unit 43, and a positioning unit 44.

The control unit 41, the storage unit 42, and the communication unit 43 of the vehicle 40 can be configured in the same manner as the control unit 11, the storage unit 12, and the communication unit 13 of the server device 10, and detailed description thereof will be omitted. The positioning unit 44 of the vehicle 40 can be configured similarly to the positioning unit 26 of the terminal device 20, and a detailed description thereof will be omitted.

Operation Example 1

Figure 2:
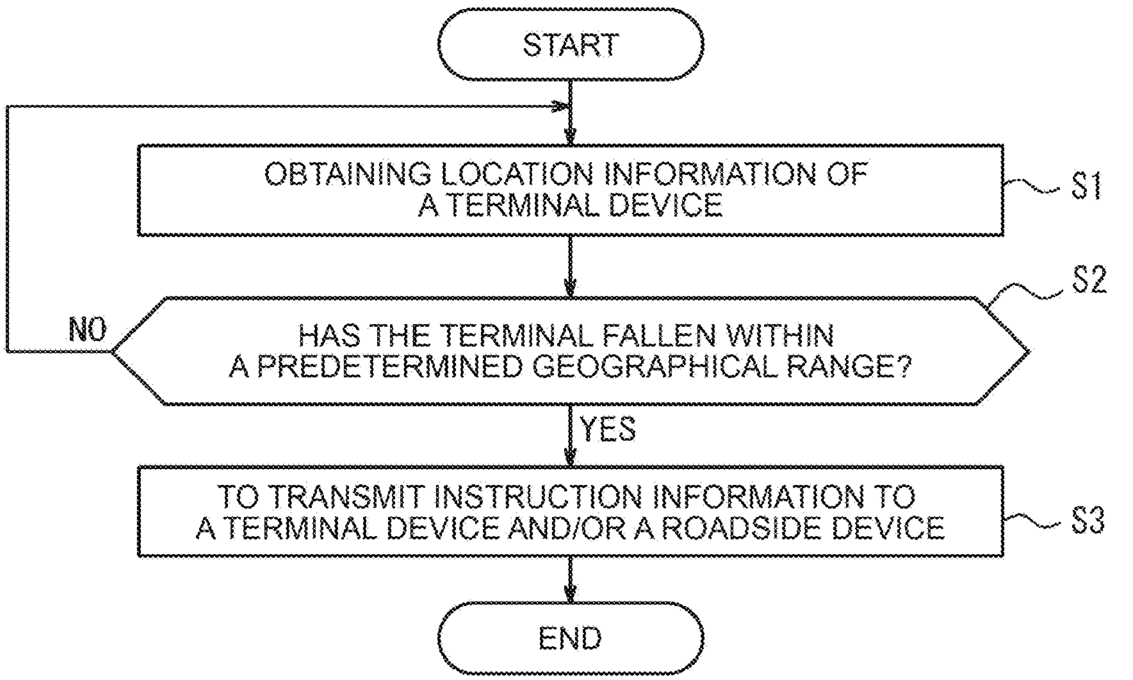
FIG. 2 is a flowchart illustrating an operation example of the server device of FIG. 1.
Figure 3:
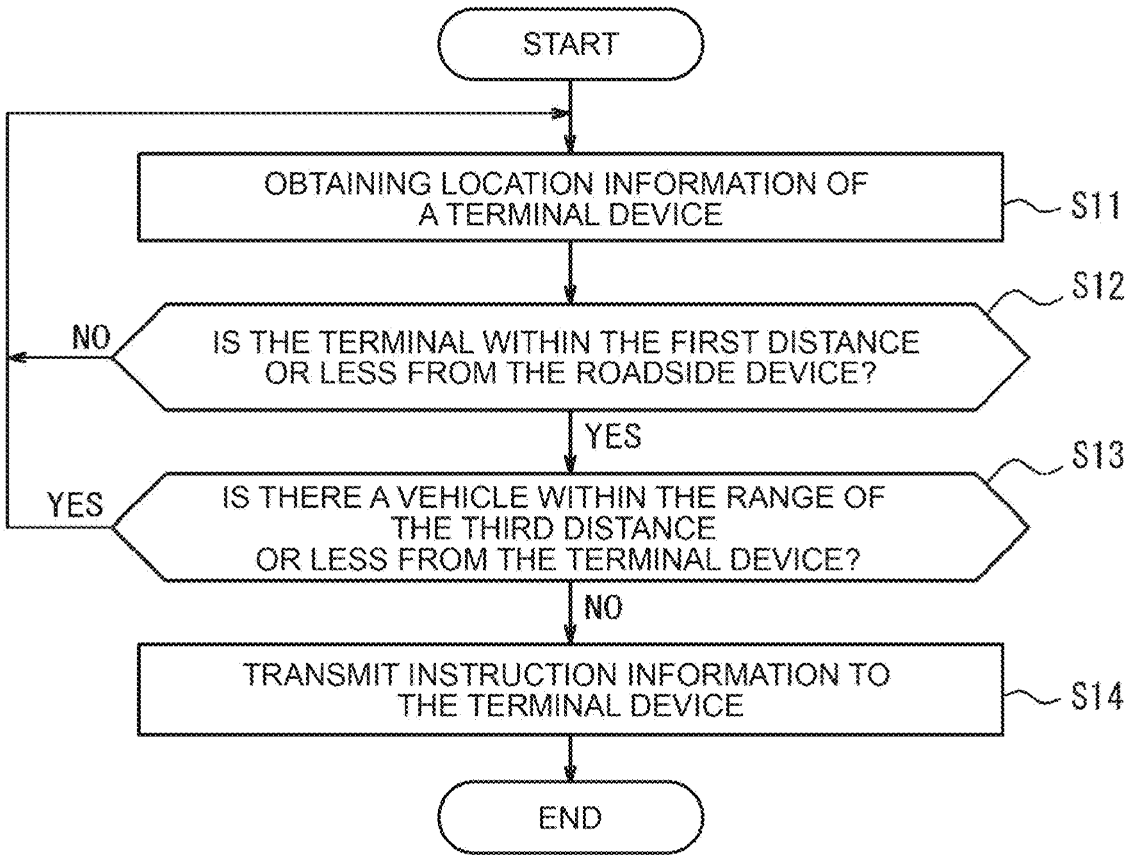
FIG. 3 is a flow chart showing an exemplary operation of the server device of FIG. 1.
Figure 4:
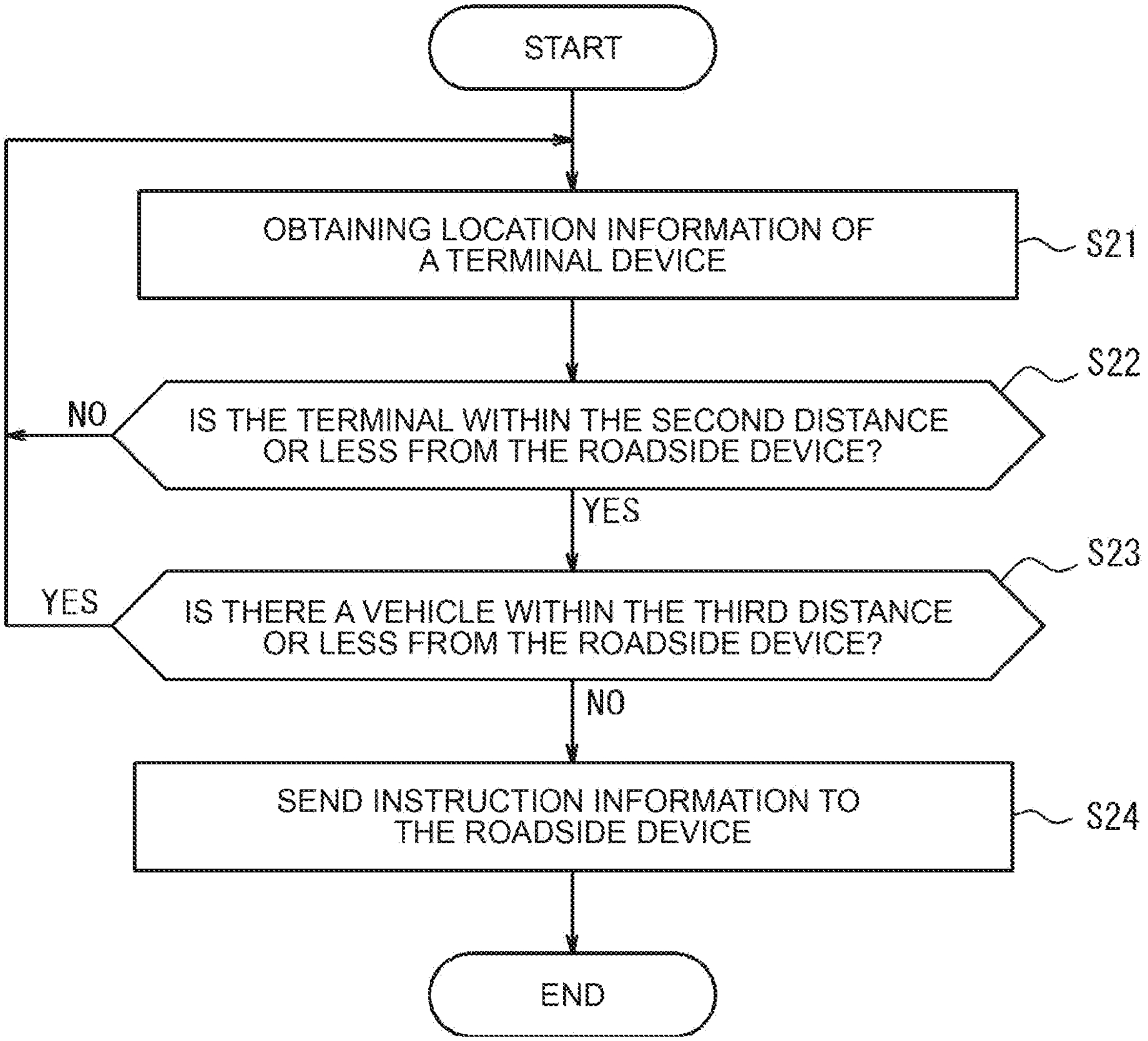
FIG. 4 is a flowchart illustrating an operation example of the server device of FIG. 1.

FIG. 2 to FIG. 4 are flowcharts showing an operation example 1 to an operation example 3 of the server device 10 of FIG. 1. The operation of the server device 10 described with reference to FIGS. 2 to 4 may correspond to one of the information processing methods. The operations of the steps of FIGS. 2 to 4 may be executed under the control of the control unit 11 of the server device 10.

In S1 of FIG. 2, the control unit 11 acquires the position data of the terminal device 20. Specifically, the control unit 11 receives the position information of the terminal device 20 measured by the positioning unit 26 from the terminal device 20 by the communication unit 13 via the network 50. Note that the control unit 11 may acquire the position information of the terminal device 20 from another device. For example, the control unit 11 may receive the positional information of the terminal device 20 acquired by the roadside device 30 analyzing the captured image of the imaging unit 34 from the roadside device 30 and acquire the positional information.

In S2, the control unit 11 determines whether or not the terminal device 20 has entered a predetermined geographical area in which the roadside device 30 is installed, based on the position information acquired by S1. Specifically, in the roadside device 30, a geographical range for explaining the function of the roadside device 30 to the pedestrian P when the pedestrian P enters is set in advance. The geographical range may be determined by a distance from the roadside device 30, or may be determined according to a terrain around the roadside device 30, a shape of a road, a congestion state, and the like. Alternatively, a certain area in which the autonomous vehicle travels may be set in advance in the server device 10 as a geographical range. When the control unit 11 detects that the terminal device 20 has entered such a geographical area (YES in S2), it proceeds to S3, and when it is not (NO in S2), it returns to S1 and continues the process.

In S3, the control unit 11 transmits instruction information for instructing the function explanation of the roadside device 30 to at least one of the terminal device 20 and the roadside device 30 by the communication unit 13. The terminal device 20 and the roadside device 30 explain the function of the roadside device 30 to the pedestrian P in response to receiving the instruction information from the server device 10. For example, in response to reception of the instruction information from the server device 10, the terminal device 20 may perform the explanation including the function of the roadside device 30, the meaning of the voice and the display, and the like by the image display and the audio output from the output unit 25, and the like. In the functional description, the terminal device 20 may activate the vibrator to alert the pedestrian P by vibration. Such a process may be performed by installing a dedicated application in the terminal device 20 held by the pedestrian P and pushing and transmitting instruction information from the server device 10 to the terminal device 20 according to the position of the terminal device 20. Alternatively, the roadside device 30 may describe the roadside device 30 in response to reception of the instruction information from the server device 10 by displaying an image from the notification unit 35, outputting sound, or the like. After finishing S3 process, the control unit 11 ends the process of the flow chart of FIG. 2.

As described above, the server device 10 describes the function of the roadside device 30 by at least one of the terminal device 20 and the roadside device 30 in response to the terminal device 20 entering a certain area where the roadside device 30 is provided. Therefore, even if the use of the roadside device 30 is the first time, the pedestrian P can accurately understand the meaning of the information output by the roadside device 30 using images, sounds, and the like, and can thereby foster a sense of security of the pedestrian P. Note that the server device 10 may control the functional description of the roadside device 30 in response to the terminal device 20 entering a specific geographical range by using the geofence technology.

Operation Example 2

Even in a case where the terminal device 20 exists in a predetermined geographical range, the vehicle 40 may be approaching to the very vicinity. In this case, when the functional description of the roadside device 30 is started, the attention of the pedestrian P is directed to the functional description, and the traffic safety of the pedestrian P may be threatened. Therefore, in a case where the vehicle 40 is traveling nearby, the server device 10 may not transmit the instruction information even when the terminal device 20 is present in a predetermined geographical range. The operation example 2 will be described with reference to FIG. 3.

In the following example, a range in which the distance from the roadside device 30 is equal to or smaller than the first distance is set in the server device 10 in advance as a geographical range for describing the function. In the following example, the function of the roadside device 30 is described from the terminal device 20.

In S11 of FIG. 3, the control unit 11 acquires the position data of the terminal device 20. The control unit 11 may execute S11 by the same process as S1 in FIG. 2.

In S12, the control unit 11 determines whether or not the terminal device 20 has entered a range in which the distance from the roadside device 30 is equal to or less than the first distance as a predetermined geographical range, based on the position information acquired by S11. The first distance may be, for example, about several km from 500 m. If the terminal device 20 is within the first distance or less from the roadside device 30 (YES in S12), the process proceeds to S13, and if not (NO in S12), the process returns to S11 and the process continues.

In S13, the control unit 11 determines whether or not the vehicles 40 are present within the third range or less from the terminal device 20. Here, the control unit 11 may acquire the positional information of the vehicle 40 and calculate the distance between the terminal device 20 and the vehicle 40 by comparing the positional information of the terminal device 20 acquired by S11. Specifically, the control unit 11 may receive the position information of the vehicle 40 measured by the positioning unit 44 from the vehicle 40 by the communication unit 13 via the network 50. Alternatively, the control unit 11 may acquire the position information of the vehicle 40 from another device. For example, the control unit 11 may receive the positional information of the vehicle 40 obtained by analyzing the captured image of the imaging unit 34 of the roadside device 30 from the roadside device 30 and obtain the positional information. The third distance may be, for example, a distance smaller than the first distance. When it is determined that the vehicles 40 exist within the third distance or less from the terminal device 20 (YES in S13), the control unit 11 returns to S11 to continue the process, and otherwise (NO in S13), the process proceeds to S14.

In S14, the control unit 11 transmits, to the terminal device 20 by the communication unit 13, instruction information instructing the function explanation of the roadside device 30. In response to receiving the instruction information from the server device 10, the terminal device 20 explains the function of the roadside device 30 to the pedestrian P. The terminal device 20 may perform the function description in the same manner as the processing described in S3 of FIG. 2. After finishing S14 process, the control unit 11 ends the process of the flow chart of FIG. 3.

As described above, the server device 10 does not explain the function of the roadside device 30 when the vehicle 40 is nearby even when the terminal device 20 enters a certain area where the roadside device 30 is provided. On the other hand, the server device 10 performs control so as to explain the function when the vehicle 40 is not present nearby. Therefore, the server device 10 is able to make known the function of the roadside device 30 while ensuring the safety of the pedestrian P, and thus, it is possible to foster a sense of security.

Operation Example 3

In the operation example 2, an example in which the function of the roadside device 30 is described by the terminal device 20 has been described, but the function of the roadside device 30 may be described by the roadside device 30 itself. However, when the roadside device 30 explains the function, it is necessary for the video, audio, and the like notified by the notification unit 35 of the roadside device 30 to reach the pedestrian P. Therefore, an operation example 3 in which the function is described from the roadside device 30 when the distance between the terminal device 20 and the roadside device 30 becomes equal to or smaller than the second distance smaller than the first distance will be described with reference to FIG. 4. In this example, a range in which the distance from the roadside device 30 is equal to or smaller than the second distance (<first distance) is set in advance in the server device 10 as a geographical range for explaining functions.

In S21 of FIG. 4, the control unit 11 acquires the position data of the terminal device 20. The control unit 11 may execute S21 by the same process as S1 in FIG. 2.

In S22, the control unit 11 determines whether or not the terminal device 20 enters a range in which the distance from the roadside device 30 is equal to or less than the second distance (<first distance) as a predetermined geographical range based on the position information acquired by S21. The second distance may be, for example, about several hundred meters from 5 meters. If the terminal device 20 is within the second distance or less from the roadside device 30 (YES in S22), the process proceeds to S23, and if not (NO in S22), the process returns to S21 and the process continues.

In S23, the control unit 11 determines whether or not the vehicles 40 are present within the third range or less from the roadside device 30. The third distance to be compared in S23 may be the same value as the third distance to be compared in S13 of FIG. 3, or may be a different value.

Here, the control unit 11 may acquire the position information of the vehicle 40 and calculate the distance between the roadside device 30 and the vehicle 40 by comparing the acquired position information with the position information of the roadside device 30. Specifically, the control unit 11 may receive the position information of the vehicle 40 measured by the positioning unit 44 from the vehicle 40 by the communication unit 13 via the network 50. Alternatively, the control unit 11 may acquire the position information of the vehicle 40 from another device. For example, the control unit 11 may receive the positional information of the vehicle 40 obtained by analyzing the captured image of the imaging unit 34 of the roadside device 30 from the roadside device 30 and obtain the positional information.

Alternatively, the control unit 11 may directly acquire the distance between the roadside device 30 and the vehicle 40 by analyzing the captured image in which the vehicle 40 is reflected, which is acquired by the imaging unit 34 of the roadside device 30.

When it is determined that the vehicles 40 exist within the third distance or less from the roadside device 30 (YES in S23), the control unit 11 returns to S21 to continue the process, and otherwise (NO in S23) proceeds to S24.

In S24, the control unit 11 transmits, by the communication unit 13, instruction information for instructing the function explanation of the roadside device 30 to the roadside device 30. The roadside device 30 explains the function of the roadside device 30 to the pedestrian P in response to receiving the instruction information from the server device 10. The roadside device 30 may perform functional explanations in the same manner as the processes described in S3 of FIG. 2. After finishing S24 process, the control unit 11 ends the process of the flow chart of FIG. 4.

As described above, the server device 10 causes the roadside device 30 to perform the functional description in response to the terminal device 20 entering a range in which the distance from the roadside device 30 is smaller than or equal to the second distance smaller than the first distance. Therefore, the server device 10 can accurately transmit the function description to the pedestrian P holding the terminal device 20. Similarly to the operation example 2, the server device 10 does not explain the function of the roadside device 30 in a case where the vehicle 40 is nearby, and performs control to explain the function in a case where the vehicle 40 is not present. Therefore, the server device 10 can make known the function of the roadside device 30 while securing the safety of the pedestrian P.

In the example described above with reference to FIGS. 3 and 4, in a case where the terminal device 20 exists in a predetermined geographical range, it is determined whether or not to explain the function of the roadside device 30 based on the distance between the terminal device 20 or the roadside device 30 and the vehicle 40. However, the present disclosure is not limited to such a configuration. For example, even when the vehicle 40 is in the vicinity of the terminal device 20 or the roadside device 30, the server device 10 may cause the terminal device 20 or the roadside device 30 to perform the function description of the roadside device 30 when the vehicle 40 is stopped. Alternatively, when the vehicle 40 moves in a direction away from the terminal device 20 or the roadside device 30, the server device 10 may cause the terminal device 20 or the roadside device 30 to perform the function description of the roadside device 30. Alternatively, the vehicle 40 may be traveling along a predetermined route by autonomous driving, and the route may deviate from the position of the terminal device 20 or the roadside device 30. In this case, even when the vehicle 40 is moving toward the terminal device 20 at that time, the server device 10 may transmit the instruction information. As described above, when it is confirmed that the safety of the pedestrian P holding the terminal device 20 is not threatened by the vehicle 40, the server device 10 may cause the terminal device 20 or the like to explain the function of the roadside device 30 regardless of the distance between the terminal device 20 or the roadside device 30 and the vehicle 40.

In the examples of FIGS. 3 and 4, when the vehicle 40 is approaching, the server device 10 does not explain the function even when the terminal device 20 exists in a predetermined geographical range regardless of the type of the vehicle 40, but is not limited to such processing. In general, the autonomous driving vehicle is harder to predict the movement as viewed from the pedestrian P than the conventional vehicle in which the driver drives, and a demand for creating a sense of security for the pedestrian P is high. The roadside device 30 exclusively provides information about the autonomous vehicle. Therefore, for example, the server device 10 refrains from describing the function when the terminal device 20 is in a predetermined geographical range and the vehicle 40 is nearby and the vehicle 40 is performing automatic driving. On the other hand, the server device 10 may explain the function when the automatic driving is not performed by the vehicle 40. In other words, the server device 10 may cause the roadside device 30 or the terminal device 20 to perform the functional explanation in a case where the vehicle 40 performing the autonomous driving does not exist in the range of the third distance or less from the roadside device 30 or the terminal device 20. For the same purpose, the server device 10 may explain the function when there is an autonomous vehicle that is within a predetermined ODD (Operational Design Domain) and there is no autonomous vehicle within a third distance or less from the roadside device 30 or the pedestrian P. Note that, as described above, the server device 10 may cause the terminal device 20 or the roadside device 30 to perform the functional explanation in a case where the vehicle 40 is present near the roadside device 30 or the terminal device 20, a case where the vehicle 40 is not moving in a direction toward the roadside device 30 or the like, and a case where the operation route deviates from the roadside device 30 or the like.

In addition, the server device 10 may cause other devices such as a street display, instead of causing the terminal device 20 or the roadside device 30 to perform the functional description of the roadside device 30. The server device 10 may perform control in which the operation example 1 to the operation example 3 and other processing examples are combined.

Further, in the above-described embodiment, an example has been described in which the server device 10 is led to cause the terminal device 20, the roadside device 30, and the like to explain the functions of the roadside device 30, but the configuration is not limited to such a configuration. For example, the roadside device 30 may automatically start the function description in response to the detection of the pedestrian P. That is, the roadside device 30 may acquire the position information of the pedestrian P and detect that the pedestrian P has entered a predetermined geographical range in which the roadside device 30 is installed, based on the acquired position information. When detecting that the pedestrian P has entered the geographical range, the roadside device 30 may cause the notification unit 35 to notify the pedestrian P of the functional description of the roadside device 30.

Here, the roadside device 30 may acquire the position information of the pedestrian P by short-range wireless communication with the terminal device 20 held by the pedestrian P or communication via a beacon or the like. Alternatively, the roadside device 30 may acquire the position information of the pedestrian P by analyzing the image captured by the pedestrian P by the imaging unit 34. Alternatively, the roadside device 30 may acquire the position information of the terminal device 20 from the server device 10.

As described above, by allowing the roadside device 30 to autonomously start the functional description based on the position information of the pedestrian P, even when communication with the server device 10 is difficult, it is possible to implement the functional description of the roadside device 30 and to foster a sense of security of the pedestrian P.

The present disclosure is not limited to the embodiment described above. For example, a plurality of blocks described in a block diagram may be integrated, or one block may be divided. The steps described in the flowcharts may be performed in parallel or in a different order depending on the processing capability of the apparatus performing each step, or as needed, instead of being performed in time series according to the description. Other changes may be made without departing from the scope of the present disclosure.

What is claimed is:

1. An information processing method to be executed by a computer configured to communicate with one or more terminal devices and one or more roadside devices, the information processing method comprising:

acquiring position information of the terminal device;

detecting, based on the acquired position information, that the terminal device has entered a predetermined geographical range in which the roadside device is installed;

detecting whether a vehicle is present in a range of a third distance or smaller from the roadside device and/or the terminal device; and transmitting, upon detection being made that the terminal device has entered the geographical range and that no vehicle is present in the range of the third distance or smaller, instruction information to provide description about a function of the roadside device to the terminal device and/or the roadside device.

2. The information processing method according to claim 1, wherein the instruction information is transmitted to the terminal device upon detection that the terminal device has entered, as the geographical range, a range in which a distance from the roadside device is equal to or smaller than a first distance.

3. The information processing method according to claim 2, wherein the instruction information is transmitted to the roadside device upon detection that the terminal device has entered, as the geographical range, a range in which the distance from the roadside device is equal to or smaller than a second distance that is smaller than the first distance.

4. A roadside device comprising a processor and a notification circuit, wherein the processor is configured to:

acquire position information of a pedestrian;

detect, based on the acquired position information, that the pedestrian has entered a predetermined geographical range in which the roadside device is installed;

detect whether a vehicle is present in a range of a third distance or smaller from the roadside device and/or the pedestrian; and cause, upon detection that the pedestrian has entered the geographical range and that no vehicle is present in the range of the third distance or smaller, the notification circuit to notify the pedestrian of a function of the roadside device.

5. An information processing method to be executed by a computer configured to communicate with a terminal device and a roadside device, the information processing method comprising:

acquiring position information of the terminal device;

detecting, based on the acquired position information, that the terminal device has entered a geographical range in which the roadside device is installed;

detecting whether a vehicle is present in a range of a third distance or smaller from the roadside device and/or the terminal device; and transmitting an instruction to the terminal device and/or roadside device to provide description about a function of the roadside device upon detection that the terminal device is within the geographical range, wherein:

the instruction is not transmitted upon detection that the vehicle is present in the range of the third distance or smaller.

6. The information processing method according to claim 5, wherein the instruction is transmitted to the terminal device upon detection that the terminal device has entered, as the geographical range, a range in which a distance from the roadside device is equal to or smaller than a first distance.

7. The information processing method according to claim 6, wherein the instruction is transmitted to the roadside device upon detection that the terminal device has entered, as the geographical range, a range in which the distance from the roadside device is equal to or smaller than a second distance that is smaller than the first distance.

* * * * *